S. R. SIKES.
FERTILIZER DISTRIBUTER.
APPLICATION FILED OCT. 19, 1911.
1,023,532.
Patented Apr. 16, 1912.
2 SHEETS—SHEET 1.
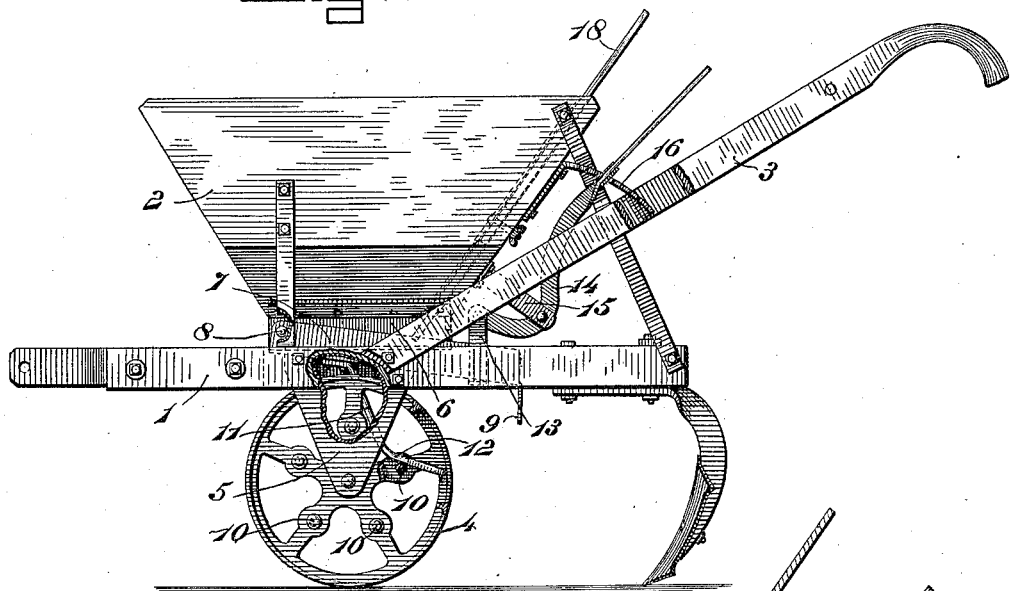
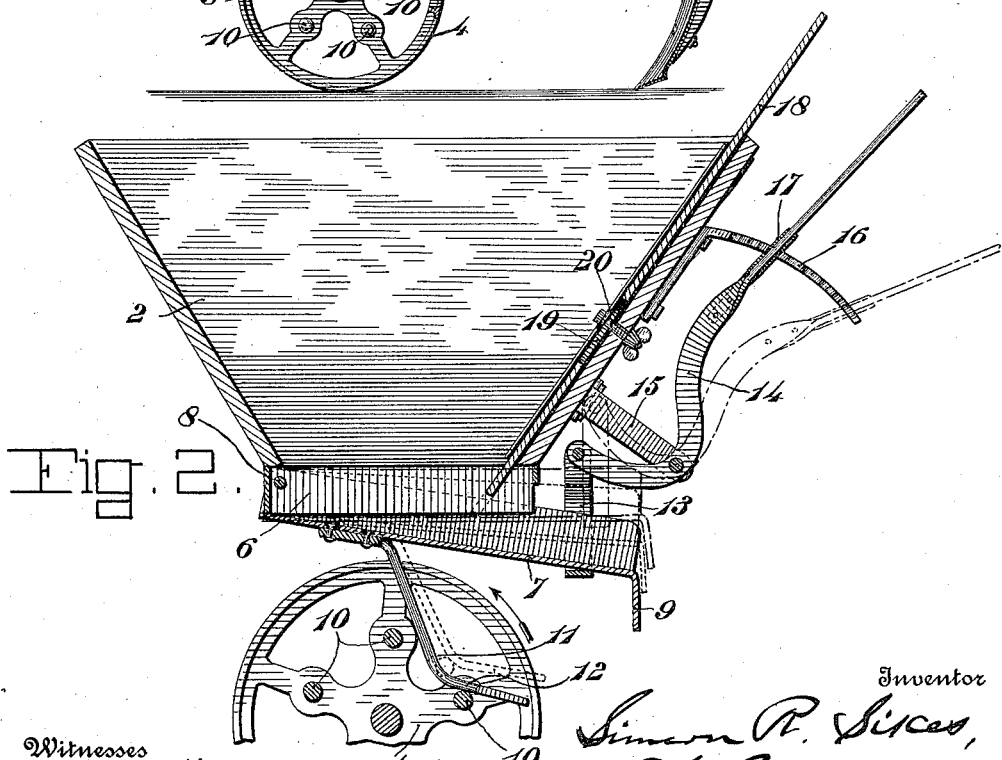

S. R. SIKES.
FERTILIZER DISTRIBUTER.
APPLICATION FILED OCT. 19, 1911.
1,023,532.
Patented Apr. 16, 1912.
2 SHEETS—SHEET 2.
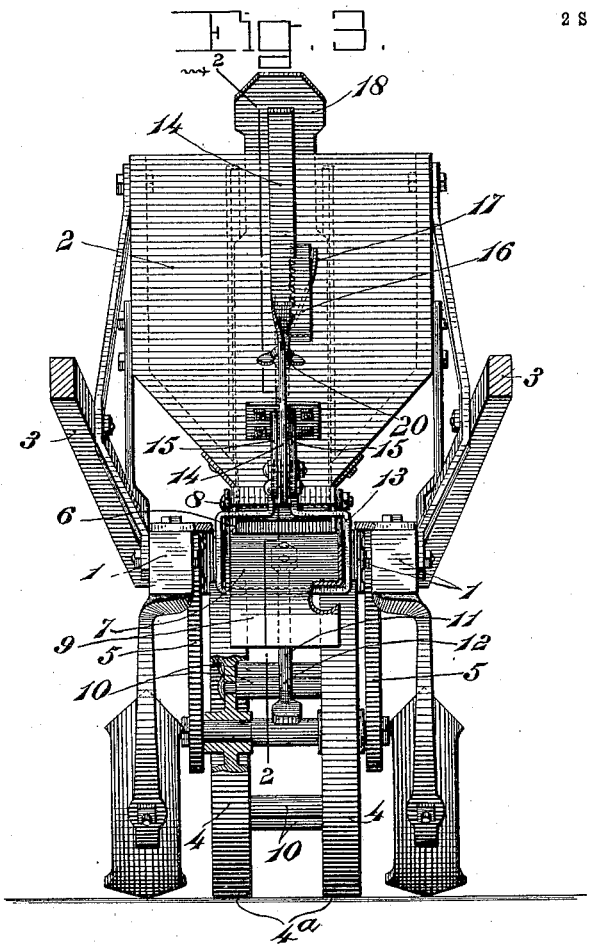

UNITED STATES PATENT OFFICE.

SIMEON R. SIKES, OF OCILLA, GEORGIA.

FERTILIZER-DISTRIBUTER.

1,023,532.  Specification of Letters Patent.  Patented Apr. 16, 1912.

Application filed October 19, 1911. Serial No. 655,579.

*To all whom it may concern:*

Be it known that I, SIMEON R. SIKES, a citizen of the United States, residing at Ocilla, in the county of Irwin and State of Georgia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in fertilizer distributers and more particularly to that type of construction which embodies a wheeled hopper and an intermittently operable gate, valve, or equivalent device actuated by or from the wheels to control the discharge of fertilizer from the hopper.

The objects of the invention are first, to provide a simple and effective arrangement for effecting the discharge of fertilizer and second, to provide means for efficiently establishing a uniform discharge rate, without regard to changes in the level of the land.

An embodiment of the invention is illustrated in the accompanying drawings, wherein:—

Figure 1 is a side elevation of the improved fertilizer distributer; Fig. 2 is a central longitudinal sectional view thereof on line 2—2 of Fig. 3; Fig. 3 is an end elevation thereof; and Fig. 4 is a detail perspective view of the movable part which directly controls the discharge of fertilizer.

Similar characters of reference designate corresponding parts throughout the several views.

The machine includes a supporting frame 1, a hopper 2 arranged centrally of the frame, handles 3 projecting rearwardly from the frame, a wheel 4 which travels upon the ground, and brackets 5 depending from the frame and in which the axle of the wheel 4 is journaled.

In the embodiment disclosed the hopper 2 has an open lower end at which is arranged a rectangular frame 6, having perpendicular walls. The fertilizer passes through the open frame 6 and is supported upon a discharging plate 7. The plate 7 has upstanding side flanges adapted to overlie the sides of the frame 6 and pivoted to said frame at the forward end thereof as by a bolt or pin 8. The plate 7 projects rearwardly for some distance beyond the frame 6 and at its rear end has a transverse downturned flange or lip 9 which facilitates the final discharge of the fertilizer. The plate 7 is always rearwardly and downwardly inclined in any operative position thereof whereby the material resting thereon may pass gradually and at a determined rate to its rear discharge end from which said material falls upon the ground. In order that the discharge of material in this manner may be made positive, the plate 7 is rocked or oscillated a certain number of times during each revolution of the wheel 4 so as to shake or jar the mass of relatively loose material in the hopper and thus effectively induce the passage of said material in the manner set forth to the rear discharge end of said plate.

For the purpose of rocking the plate 7 the wheel 4 includes in its make-up transverse pins 10 which are arranged at regular intervals and are provided to engage a suitably formed tongue 11 which is secured to and projects downwardly from the under face of said plate. The wheel 4 preferably includes two spaced wheel sections $4^a$ arranged in parallel planes and the pins 10 connect the sections $4^a$, being joined to the spokes thereof. The tongue 11 projects between the sections $4^a$ and its lower end is extended angularly as at 12 for engagement by said pins.

The plate 7 is supported at its front end by the pin or bolt 8 aforesaid and at its rear end by a stirrup 13 through which the rear end portion of said plate loosely passes and which has such height as to provide for the plate having an efficient range of rocking movement. The stirrup 13 is pivotally hung from the lower end of a bent lever 14, the latter being pivoted to a bracket 15 which projects rearwardly from the rear wall of the hopper. The upper handle portion of said lever works with relation to a rack 16 which projects from the rear wall of the hopper and is held to engage in the notches of said rack by a spring 17. It is of course understood that the pivotal connection between the lever 14 and the bracket 15 is sufficiently loose to enable said lever to have such lateral play or movement as is necessary for its engagement with or its disengagement from the rack 16.

The rear wall of the hopper is provided on its inner face with a plate 18 which has a slot 19 for the passage of the bolt of a bolt and nut fastening 20. The lower end of the plate 18 projects into the frame 6 and extends wholly across the latter. The degree to which the lower end of the plate 18 thus projects into said frame is of course determined by the position of said plate, the latter obviously being adjustable. The office of the plate 18 is to regulate the normal rate of discharge of the fertilizer, the discharge opening for the latter being defined by the plate 7, its side flanges, and the lower edge of the plate 18. Obviously this discharge opening is of greater or less size in accordance with the position of the plate 18, which position is selected with regard to the rate of discharge which is desired.

The operation will be readily apparent from the foregoing description. It is of course obvious that as the wheel 4 revolves the pins 10 successively engage the extension 12 of the tongue 11 and thereby raise the plate 7. As each pin passes by said extension 12 the plate 7 drops upon the lower cross strap of the stirrup 13, remaining in this position until the tongue 11 is engaged by the next pin 10. In this manner a rapid rocking of the plate 7 is produced which serves to shake or jar the material in the hopper and to facilitate its passage rearwardly along the plate 7 as above explained.

In changing from the level to a grade it is necessary to regulate the size of the discharge opening, partially defined, as above explained, by the lower edge of the plate 18. Otherwise the rate of discharge would vary; increasingly for an up grade and decreasingly for a down grade. This regulation is effected by manipulating the lever 14 to raise or lower the stirrup 13 and thereby decrease or increase the efficient maximum size of the fertilizer discharge opening. In changing from a level to an up grade the stirrup 13 is raised, in accordance with the grade, and in like manner in changing from a level to a down grade the stirrup 13 is lowered. The normal rate of flow is obviously regulated by the position of the plate 18, and when regulated is maintained for any grade by positioning the lever 14 in accordance with the grade in the manner above explained. If desired or necessary the lever 14 can be operated to cause the plate 7 to wholly close the lower end of the hopper as is obvious.

Having fully described my invention, I claim:—

1. A fertilizer distributer comprising a frame, a hopper, and a ground wheel located beneath the hopper the hopper having an open lower end, a discharge plate arranged under said lower end over the ground wheel and pivoted adjacent the forward side of the hopper, the plate having a rearwardly projecting discharge portion, a stirrup through which the discharge portion loosely passes, a tongue projecting downwardly from the underface of the plate, and transverse pins associated with the ground wheel to successively engage the tongue and thereby produce a rocking action of the plate.

2. A fertilizer distributer comprising a frame, a hopper, and a ground wheel the hopper having an open lower end, a discharge plate arranged under said lower end and pivoted adjacent the forward side of the hopper, the plate having a rearwardly projecting discharge portion, a stirrup through which the discharge portion loosely passes, a tongue projecting downwardly from the underface of the hopper, and transverse pins associated with the ground wheel to successively engage the tongue and thereby produce a rocking action of the plate, the stirrup being vertically adjustable whereby to increase or decrease the range of rocking movement of said plate.

3. A fertilizer distributer comprising a frame, a hopper and a ground wheel the hopper having an open lower end, a discharge plate arranged under said lower end and pivoted adjacent the forward side of the hopper, a pivotally supported lever, a stirrup hung from the lower end of the lever, the rear projecting portion of the discharge plate passing loosely through and being supported by the stirrup, the lever being operable to raise or lower the stirrup, and means acting in accordance with the revolutions of the ground wheel for rocking the plate.

4. A fertilizer distributer comprising a frame, a hopper and a ground wheel, the hopper having an open lower end, a discharge plate arranged under said lower end and pivoted adjacent the forward side of the hopper, a pivotally supported lever, a stirrup hung from the lower end of the lever, the rear projecting portion of the discharge plate passing loosely through and being supported by the stirrup, the lever being operable to raise or lower the stirrup, and means acting in accordance with the revolutions of the ground wheel for rocking the plate, the means consisting of transverse pins associated with the ground wheel and a tongue projecting from the underface of the plate for successive engagement by said pins.

5. A fertilizer distributer comprising a frame, a hopper, and a ground wheel, the hopper having an open lower end and having a rectangular frame arranged at said lower end, a plate extending under the lower end of the hopper and pivoted to the forward end of the rectangular frame, the plate having upstanding side flanges adapted to overlie the sides of the frame and having a rearwardly projecting portion, a stirrup through which the rearwardly projecting portion of the plate loosely passes and which supports the latter, and means acting in accordance with the revolutions of the ground wheel for rocking the plate.

In testimony whereof I affix my signature in presence of two witnesses.

SIMEON R. SIKES.

Witnesses:
W. W. BRYAN,
F. L. TAYLOR.

Copies of this patent may be obtained for five cents each, by addressing the "Commissioner of Patents, Washington, D. C."